United States Patent [19]

Mayumi et al.

[11] Patent Number: 4,853,576
[45] Date of Patent: Aug. 1, 1989

[54] MINIATURE MOTOR

[75] Inventors: Etsuo Mayumi; Kunio Hiromasa, both of Matsudo, Japan

[73] Assignee: Mabuchi Motor Co., Ltd., Japan

[21] Appl. No.: 37,737

[22] Filed: Apr. 13, 1987

[30] Foreign Application Priority Data

May 1, 1986 [JP] Japan .............................. 61-66664[U]

[51] Int. Cl.[4] ............................................. H02K 13/00
[52] U.S. Cl. ..................................... 310/239; 310/42; 310/43; 310/71; 310/89; 29/597
[58] Field of Search ............... 310/239, 242, 245, 247, 310/246, 40 MM, 42, 88, 89, 91, 71, 154, 43; 29/597

[56] References Cited

U.S. PATENT DOCUMENTS

| | | | |
|---|---|---|---|
| 3,445,692 | 5/1969 | Kato | 310/154 |
| 4,041,339 | 8/1977 | Huber | 310/246 X |
| 4,127,785 | 11/1978 | Noguchi | 310/40 MM |
| 4,152,614 | 5/1979 | Noguchi | 310/40 MM |
| 4,728,835 | 3/1988 | Baines | 310/71 |
| 4,746,829 | 5/1988 | Strobl | 310/242 |

Primary Examiner—R. Skudy
Attorney, Agent, or Firm—McGlew and Tuttle

[57] ABSTRACT

A miniature motor having a motor case comprising a motor housing, fitted with a permanent magnet field and having an opening at one end thereof; an insulating brush base, made of a synthetic resin, fitted to the opening of the motor housing for holding brushgear; and a cover plate, made of a metallic member, covering the surface of the insulating brush base; the motor housing having a plurality of crimping pieces formed by notching the edge of the motor housing opening; the cover plate being fitted to the motor housing by engaging the cover plate with the motor housing opening, and bending and crimping the crimping pieces, characterized in that the cover plate has along the outer periphery thereof a plurality of recesses, which are concave toward the motor shaft, and the recesses are crimped by means of the crimping pieces so as to fixedly fit the cover plate to the motor housing.

5 Claims, 1 Drawing Sheet

MINIATURE MOTOR

BACKGROUND OF THE INVENTION

This invention relates generally to a miniature motor, and more particularly to a miniature motor having such a construction that a cover plate is fixedly fitted to a motor housing by crimping the cover plate, which is engaged with the opening of the motor housing to the motor housing, by means of crimping pieces provided on the opening of the motor housing, and that recesses, which are concave toward the motor shaft, are provided along the outer periphery of the cover plate; and the recesses are crimped by means of the crimping pieces.

DESCRIPTION OF THE PRIOR ART

Conventionally, cover plates used in miniature motors are made of synthetic resin moldings. Such synthetic resin materials have drawbacks such as (i) vulnerability to heat, and (ii) proneness to distortion due to flexibility. To overcome these drawbacks, a cover plate comprising an insulating brush base, made of a synthetic resin, and a metallic member disposed on and fixedly fitted to the insulating brush base by means of a fixing means, such as crimping or integral molding has been conceived. As shown in FIG. 3, a cover plate 1 is engaged with and crimped to the opening of a motor housing 2 by means of a plurality of crimping pieces 3 provided on the opening of the motor housing 2. In the figure, numeral 4 indicates a metallic member, as described above.

In the conventional type of miniature motor, the cover plate 1 is engaged with and crimped to the motor housing 2 in the direction of motor rotation by the crimping force of the crimping pieces 3. This could result in the unwanted rotation of the cover plate 1 with respect to the motor housing 2 in the opposite direction of motor rotation, particularly when the load fluctuates. Furthermore, it is difficult to position the cover plate 1 on the motor housing 2. Another problem is that dirt and dust tend to enter the motor inside through gaps between the cover plate 1 and the motor housing 2 at the crimped positions.

SUMMARY OF THE INVENTION

This invention is intended to overcome the above discussed problems. To accomplish this, the miniature motor of this invention has a motor housing fitted with a permanent magnet field and having an opening at one end thereof, an insulating brush base, made of a synthetic resin, fitted to the motor housing opening for holding brushgear, and a cover plate, made of a metallic member, covering the surface of the insulating brush base; the motor housing having a plurality of crimping pieces formed by notching the edge of the motor housing opening; the cover plate being fixedly fitted to the motor housing by engaging with and crimping to the opening of the motor housing by bending and crimping the crimping pieces, and has such a construction that the cover plate has along the outer periphery thereof a plurality of recesses, which are concave toward the motor shaft, and is fixedly fitted to the motor housing by crimping the recesses by means of the crimping pieces.

These and other objects and advantages of this invention will become apparent from the following description taken in connection with the accompanying FIGS. 1 and 2.

DETAILED DESCRIPTION OF THE EMBODIMENT

Figure 1:
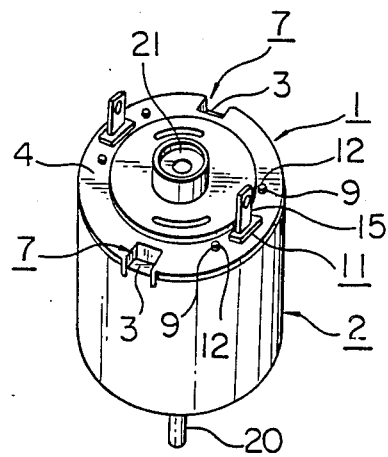
FIG. 1 is a perspective view illustrating a miniature motor embodying this invention.

FIG. 1 is a perspective view illustrating a miniature motor embodying this invention. In the following, the embodiment shown in FIG. 1 will be described, with reference to FIG. 2 which is an exploded view of the embodiment shown in FIG. 1.

Figure 2:
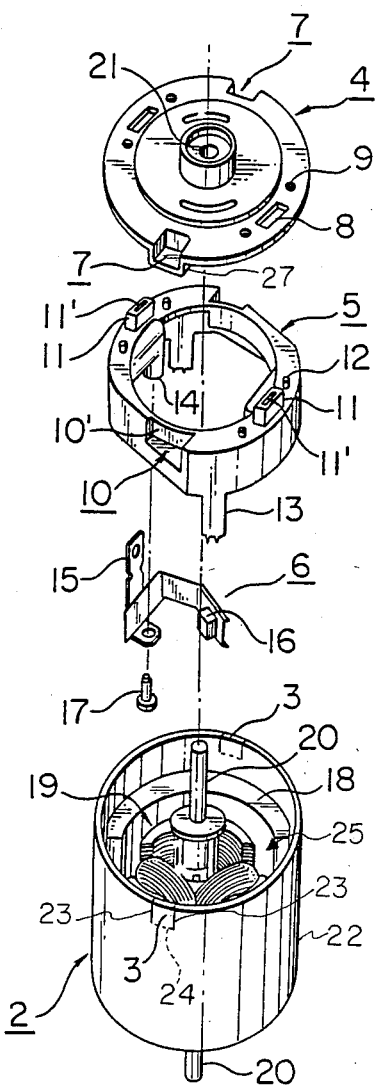
FIG. 2 is an exploded view of the embodiment shown in FIG. 1.
Figure 3:
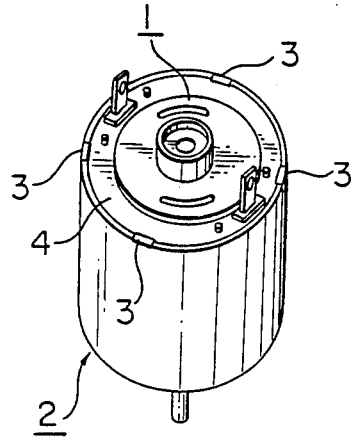
FIG. 3 is a perspective view of a conventional type of miniature motor.

In FIGS. 1 and 2, reference numeral 1 refers to a cover plate or cover member; 2 to a miniature motor housing formed of a cylindrical housing wall 22; 3 to a crimping piece including side portions 23 disconnected from the miniature motor housing 2 and a base portion 24 connected to the miniature motor housing 2; 4 to a metallic member; 5 to an insulating brush base, made of a synthetic resin; 6 to a brush member; 7 to a recess formed on the metallic member; 8 to a terminal mount hole; 9 to a boss hole; 10 to a base recess; 10' to an inner side wall of the base recess 10; 11 to a terminal mount; 11' to a terminal hole; 12 to a crimping boss; 13 to a magnet retainer; 14 to a brush fixing member; 15 to a terminal; 16 to a brush; 17 to a brush fixing pin; 18 to a permanent magnet; 19 to a rotor positioned in a motor chamber 25; 20 to a rotating shaft; and 21 to a bearing, respectively.

A cover plate or cover member 1 shown in FIG. 1 is composed of the metallic member 4 and the insulating brush base 5. The metallic member 4 has a bearing 21 and a metallic member recess 7 formed by stamping forming a recess 7 on one side of the metallic cover plate member 4 and a protruding portion 27 on the opposite side, for example, a terminal mount hole 8 and a boss hole 9. The insulating brush base 5 is molded in a synthetic resin, and has a base recess 10 having a base recess side wall 10' for engagement with the metallic member recess 7, a terminal mount 11 having a terminal hole 11' into which a terminal is inserted, as will be described later, a crimping boss 12, a magnet retainer 13 for retaining a permanent magnet 18, which will be described later, and a brush fixing member 14 for fixedly fitting a brush member 6. The cover plate of this invention is constructed by crimping the crimping boss 12 after the metallic member 4 is disposed on the insulating brush base 5 so that the recess 7 of the metallic member 14 is engaged with the recess 10 of the insulating brush base 5, and the terminal mount 11 and the crimping boss 12 of the insulating brush base 5 are engaged with the terminal mount hole 8 and the boss hole 9 on the metallic member 4, respectively. On the cover plate 1, the terminal 15 of the brush member 6 is inserted into the terminal hole 11' and the brush member 6 having the brush 16 is fixedly fitted by means of the brush fixing pin 17.

As described above, the embodiment of this invention shown in FIG. 1 is completed by engaging the cover plate 1, to which the brush member 6 is fitted, with the open end of the motor housing 2 fitted with the permanent magnet 18 and the rotor 19 in the motor chamber 25, and crimping the recess 7 formed on the metallic member 4 comprising the cover plate 1 by means of the crimping pieces 3 formed on the motor housing 2.

In the embodiment shown in FIG. 1, one end of the rotating shaft 20 of the rotor 19 is supported by the bearing (not shown) provided on the motor housing 2, and the other end thereof is supported by the bearing 21 provided on the metallic member 4.

As described in the foregoing, this invention, in which crimping is performed at recesses provided on the cover plate, makes it easy to position the cover plate when installing on the motor housing, enabling the cover plate to be firmly secured to the motor housing, thus preventing the cover plate from unwantedly rotating during motor rotation. The recess of the insulating brush base is isolated from the motor inside by the inner side wall of the base recess, making it possible to prevent dirt and dust from entering the motor inside.

What is claimed is:

1. A miniature motor comprising: a miniature motor housing with a substantially cylindrical housing wall defining a motor chamber, said miniature motor housing having an open end, said miniature motor housing having crimping portions formed in said cylindrical housing wall at spaced locations adjacent said miniature motor housing open end, each of said crimping portions including side portions disconnected from said miniature motor housing and each of said crimping portions including a base portion connected to said miniature motor housing; a permanent magnet positioned within said motor housing motor chamber; a cover member for engagement with said miniature motor housing at said miniature motor housing open end, including a substantially annular insulating brush base member formed of synthetic resin having an outer circumferential surface of a predetermined width engaging with the miniature motor housing, said insulating brush base member including means to support a commutator brush, said insulating brush base member including recess portions formed in said outer circumferential surface, said insulating brush base member being positioned in said housing through said housing opening such that said recess portions are in alignment with said crimping portions of said housing; and, a metallic member cover plate formed of metallic material engaging said miniature motor housing and said brush base insulating member to cover said brush base insulating member and to cover said miniature motor housing open end, said cover plate having a plurality of recesses corresponding in number and position to said brush base member recess portions in alignment with said crimping portions, said brush base insulating member and said cover plate being fixedly fitted to said housing by said crimping portions which extend into respective recesses, said recesses and crimping portions being in crimping engagement.

2. A miniature motor according to claim 1, wherein: said recess portions of said brush base insulating member include insulating recess portions associated with each of said brush base recess portions for separating and insulating a motor within said motor chamber from exterior of said motor chamber.

3. A miniature motor according to claim 1, wherein: said insulating brush base member includes terminal mounts defining terminal holes through which brush terminals pass, said cover portion including boss alignment holes adapted to receive crimping portions bosses of said cover plate when said cover plate and said base brush insulating member are in engagement with said housing, said crimping bosses and said boss alignment holes acting to align said cover plate and said base brush insulating member for engagement with said housing.

4. A miniature motor according to claim 1, wherein: said cover plate recess is defined by a protruding lower portion adapted to engage one of said recess portions of said base brush insulating member.

5. A miniature motor according to claim 1, wherein: said cover plate recesses are formed by stamping recesses into said cover plate thereby forming a recess on one side of said cover plate and a protruding portion on an opposite side of said cover plate.

* * * * *